(12) United States Patent
Kawano et al.

(10) Patent No.: US 7,144,641 B2
(45) Date of Patent: Dec. 5, 2006

(54) MAGNETIC BACKLAYER

(75) Inventors: Hiroyasu Kawano, Kawasaki (JP); Takeshi Morikawa, Kawasaki (JP); Koji Matsumoto, Kawasaki (JP); Satomi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/024,993

(22) Filed: Dec. 30, 2004

(65) Prior Publication Data

US 2005/0118460 A1 Jun. 2, 2005

Related U.S. Application Data

(63) Continuation of application No. PCT/JP02/08587, filed on Aug. 26, 2002.

(51) Int. Cl.
*G11B 5/66* (2006.01)
*G11B 5/70* (2006.01)

(52) U.S. Cl. .................................................. 428/828

(58) Field of Classification Search ............... 428/611, 428/687, 65.3, 694 R, 694 TS, 694 T, 694 TM, 428/694 TR, 900, 828, 828.1; 360/283, 360/286, 272
See application file for complete search history.

(56) References Cited

U.S. PATENT DOCUMENTS

| | | | |
|---|---|---|---|
| 6,524,730 B1 * | 2/2003 | Chen .................... | 428/694 TM |
| 6,531,202 B1 * | 3/2003 | Litvinov et al. ......... | 428/694 T |
| 6,682,826 B1 * | 1/2004 | Shimizu et al. ............. | 428/611 |
| 6,713,197 B1 * | 3/2004 | Nakamura et al. ... | 428/694 TM |
| 6,723,458 B1 * | 4/2004 | Shimizu et al. ........ | 428/694 TS |
| 6,753,072 B1 * | 6/2004 | Chen et al. .......... | 428/694 TM |
| 6,808,824 B1 * | 10/2004 | Tanahashi et al. .......... | 428/611 |
| 6,818,330 B1 * | 11/2004 | Shukh et al. ........ | 428/694 TM |

FOREIGN PATENT DOCUMENTS

| | | |
|---|---|---|
| JP | 2002-216339 | * 12/1899 |
| JP | 61-5423 | 1/1986 |
| JP | 6-76202 | 3/1994 |
| JP | 6-136542 | 5/1994 |
| JP | 7-85442 | 3/1995 |
| JP | 9-282656 | 10/1997 |
| JP | 2001-155321 | 6/2001 |
| JP | 2001-250223 | 9/2001 |
| JP | 2002-42318 | 2/2002 |
| JP | 2002-100030 | 4/2002 |
| JP | 2002-133647 | 5/2002 |
| JP | 2002-157730 | 5/2002 |
| JP | 2002-170216 | 6/2002 |

OTHER PUBLICATIONS

Translation JA 61-5423.*
Translation JA 06-136542.*
Translation JA 9-282656.*

(Continued)

*Primary Examiner*—Holly Rickman
(74) *Attorney, Agent, or Firm*—Westerman, Hattori, Daniels & Adrian, LLP.

(57) ABSTRACT

This invention relates to a magnetic backlayer, and provides a magnetic backlayer giving a small spike noise spk and a small media noise Nm and exhibiting a large saturation magnetization Ms to have a good soft magnetic property. The magnetic backlayer is formed on a substrate; has a structure in that soft magnetic layers comprising iron and carbon as main components and nonmagnetic layers are alternately laminated; and has easy axes of magnetization in the in-plane direction of the film and the radius direction of the substrate.

7 Claims, 12 Drawing Sheets

OTHER PUBLICATIONS

Translation JA 2002-170216.*
Translation JA 2001-250223.*
Translation JA 2001-155321.*
Translation JA 2002-133647.*
Translation JA 2002-42318.*
Translation JA 2002-216339.*

* cited by examiner

MAGNETIC BACKLAYER

This application is a continuation of international application PCT/JP02/08587 filed on Aug. 26, 2002.

TECHNICAL FIELD

This invention relates to a magnetic backlayer, in particular, a magnetic backlayer used as a backlayer of an information recording medium in a perpendicular magnetic recording mode.

BACKGROUND ART

The in-plane magnetic recording mode, wherein magnetic anisotropy is exhibited along the in-plane direction of the discs, has been used for hard discs used for some time. Nowadays, however, a perpendicular magnetic recording mode is suggested to improve the linear recording density (recording density in the direction of tracks) of discs.

In hard discs in the perpendicular magnetic recording mode, information is recorded in their magnetic film having perpendicular magnetic anisotropy (for example, TbFeCo).

In the perpendicular magnetic recording mode, a soft magnetic film is formed as a backlayer between a substrate and a magnetic film in order to record and reproduce information in this magnetic film at a high density and a high efficiency (see Japanese Unexamined Patent Publication No. Hei 06(1994)-76202).

A backlayer is formed as a film having magnetization direction in the in-plane direction of a disc. This is a layer for obtaining a large and sharp magnetic field by magnetic interaction generated between a magnetic head and the backlayer so as to carry out perpendicular magnetic recording in the magnetic film with high efficiency. From the viewpoint of the efficiency of recording and reproducing, a magnetic material having a small coercive force Hc, such as FeNi based alloy, is used in the backlayer.

<Kinds of Noises>

In order to heighten the reliability of the quality of signals for recording and reproducing, it is desired to decrease noises caused by the backlayer and make the saturation magnetization Ms as large as possible. Noises caused by the backlayer are classified into the following three kinds:

(a) stripe-form magnetic domain noises, (b) spike noises, and (c) media noises based on random magnetic domains.

(a) Stripe-Form Magnetic Domain Noises

Noises generated by an inclination of magnetization from the in-plane direction to the perpendicular direction in the case that the film thickness of the backlayer is made large (for example, 150 nm or more).

(b) Spike Noises Spk

Noises generated in portions of a disc where magnetic direction in a backlayer is uneven in the case that the film thickness of its backlayer is made large (for example, 70 nm or more). The noises are noises generated by the matter that the backlayer forms Bloch magnetic walls.

(c) Media Noises Nm Based on Random Magnetic Domains

Noises generated in a broad band from a low frequency band to a high frequency band since random and large magnetic domains are formed in the case that the backlayer exhibits no soft magnetic property.

In order to decrease such noises, some countermeasures are suggested. For example, stripe-form magnetic domain noises are decreased by making the backlayer into a laminated structure wherein some soft magnetic layers and nonmagnetic layers are laminated and setting the film thickness of the soft magnetic layers and that of the nonmagnetic layers to about 100 nm and about 5 nm, respectively.

By making the backlayer into a laminated structure as described above, setting the film thickness of its soft magnetic layers and that of its nonmagnetic layers to about 200 nm and about 5 nm, respectively, and repeating this period several times, the amplitude of spike noises spk are suppressed. In order to decrease spike noises spk, it is known that it is necessary to make easy axes of magnetization of the soft magnetic layers even along the radius direction of the disc substrate.

In order to decrease medium noises Nm and to cause the backlayer to exhibit soft magnetic property, it is generally necessary to make magnetic domains of the backlayer small.

<Countermeasures for Decreasing Noises>

It is generally known that: when the magnetic wall structure of the backlayer turns to Bloch magnetic walls, spike noises spk are easily generated; and when the magnetic wall structure turns to Neel magnetic walls, no spike noises spk are generated. It is also known that: as the film thickness of the backlayer is larger, the backlayer is further dominated by Bloch magnetic walls; and in the case that the film thickness is thin (about 20 nm), the layer is dominated by Neel magnetic walls.

(1) Thus, suggested is a magnetic recording medium wherein the film thickness of a laminated unit of a backlayer is made small to decrease spike noises, thereby changing its magnetic wall structure from Bloch magnetic walls to Neel magnetic walls and having a multi-layered structure comprising thin films composed of soft magnetic layers and nonmagnetic layers (Japanese Unexamined Patent Publication No. Sho 61(1986)-5423). Therein, however, the film thickness of each of the periods in the backlayer is about 100 nm or more; therefore, it cannot be said that spike noise spk are sufficiently decreased.

(2) There is suggested a soft magnetic backlayer wherein soft magnetic layers (FeCo films) and nonmagnetic separating layers (Cr layers) are alternately and repeatedly laminated in order to decrease noises based on magnetic fluxes leaking out from magnetic walls in the soft magnetic backlayer (Japanese Unexamined Patent Publication No. Hei 06(1994)-136542). However, the FeCo films and the Cr layers are each made into a film thickness of 1 μm, and are each very thick. It can be therefore considered that Bloch magnetic walls are formed in the FeCo films. Accordingly, even if the noises based on the leaking magnetic fluxes can be decreased, the amplitude of spike noises spk cannot be easily suppressed.

(3) A structure for decreasing medium noises in the case of using a FeAlSi multi-layered film as a soft magnetic layer is also suggested (IEEE Trans. Magn., vol. 37, p. 1586, No. 4, 2001, "Low Noise FeAlSi Soft Magnetic Under-Layer for CoPtCrO Double Layered Perpendicular Recording").

Therein, a soft magnetic backlayer is made into a multi-layered structure wherein soft magnetic layers (FeAlSi layers) and nonmagnetic layers (C layers) are alternately laminated. In this structure, media noises can be made remarkably lower than in a structure having a FeAlSi mono-layered film. However, the saturation magnetization Ms of the backlayer is a low value of about 800 emu/cc or less. Thus, no sufficient recording efficiency can be given. Additionally, no mention is made of a decrease in spike noises spk.

About presently-used material having a large saturation magnetization Ms, it is difficult to cope with both of the matter that the material is softly magnetized and the matter that easy axes of magnetization of the material is made even along the radius direction of a medium substrate. It is therefore difficult to decrease spike noises spk.

DISCLOSURE OF THE INVENTION

This invention provides a magnetic backlayer having a large saturation magnetization Ms, wherein easy axes of magnetization are made even along the radius direction of a substrate, Neel magnetic walls are predominant, and the amplitude of spike noises are suppressed.

The magnetic backlayer according to the invention has a structure in that soft magnetic layers comprising iron and carbon as main components and nonmagnetic layers are alternately laminated, is formed on or over a substrate, has easy axes of magnetization in the in-plane direction of the film and the radius direction of the substrate, and has saturation magnetization Ms of 1000 emu/cc or more.

In order to suppress the amplitude of the spike noises spk and set the saturation magnetization Ms to the following: Ms>1000 emu/cc, preferably, the total film thickness of each period of the soft magnetic layers and the nonmagnetic layers is in the range of 10 to 25 nm (inclusive).

According to this invention, the magnetization wall of the soft magnetic layers has a Neel magnetic wall structure.

In order to suppress generation of noises, preferably, the soft magnetic layers comprise a magnetic material made mainly of Fe and a nonmagnetic material comprising a metalloid element, and the nonmagnetic layers are made mainly of a dielectric material and the specific resistance of the nonmagnetic layers is larger than that of the soft magnetic layers.

This invention also provides a magnetic backlayer wherein the coercive force $H_{c0}$ along the easy axes of magnetization satisfies the following: $H_{c0}$<0.5 oersted, and the coercive force $H_{c1}$ of the soft magnetic layers themselves satisfies the following: $H_{c1}$<2 oersteds.

This invention also provides a magnetic backlayer which has a surface roughness Ra adjusted as follows: Ra<1 nm.

BEST MODE FOR CARRYING OUT THE INVENTION

Hereinafter, this invention is described in detail on the basis of the drawings. However, this invention is not limited thereto.

The magnetic backlayer of this invention is a magnetic film having a multi-layered structure wherein soft magnetic layers and nonmagnetic layers are laminated.

This invention provides a magnetic backlayer satisfying all characteristics as described in the following.

(1) Easy axes of magnetization of its soft magnetic layers are along the in-plane direction of its substrate, and are even along the radius direction.

(2) The saturation magnetization Ms thereof is larger than 1000 emu/cc.

(3) Magnetic walls of the soft magnetic layers have Neel magnetic wall structure.

(4) About the coercive force $H_{c0}$ of the magnetic backlayer along the easy axes of magnetization thereof, $H_{c0}$ is <0.5 oersted, and about the coercive force $H_{c1}$ of the soft magnetic layers themselves, $H_{c1}$ is <2 oersteds.

(5) The value of the spike noises spk is 200 μV or less.

(6) The media noise Nm is 1 μVrms or less.

Hitherto, magnetic backlayers satisfying either one of these characteristics have been realized, but no soft magnetic backlayers having all of the characteristics have been realized.

Figure 2:
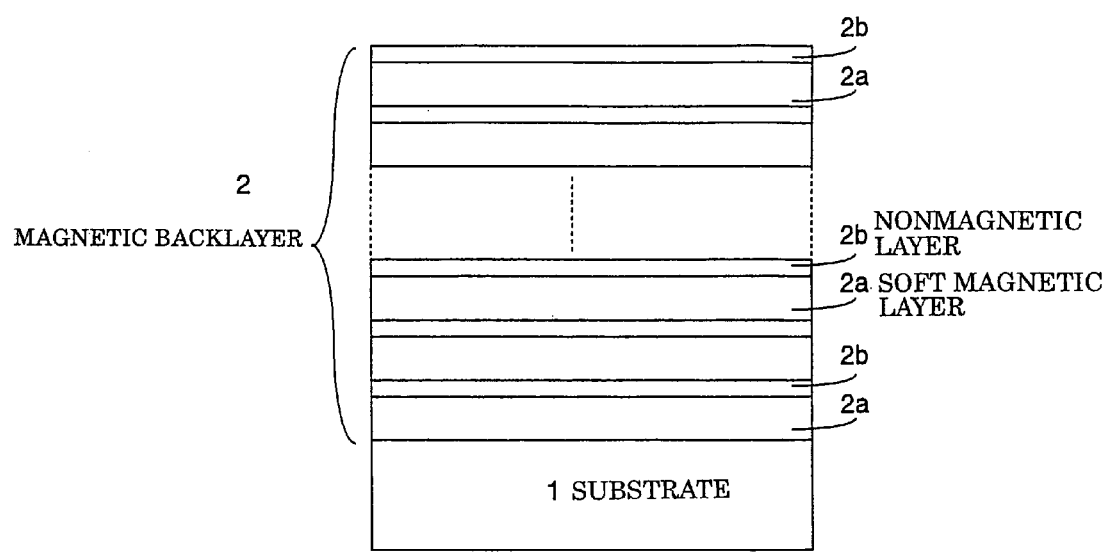
FIG. 2 is a structural view of a backlayer of this invention.

In order for a magnetic backlayer 2 of this invention to satisfy these characteristics (1) to (6), the film 2 has a structure wherein soft magnetic layers 2a and nonmagnetic layers 2b are alternately laminated as illustrated in FIG. 2, the soft magnetic layers 2a are made of a material comprising iron and carbon as main components, and the nonmagnetic layers 2b are made of a material comprising a dielectric material as a main component and having a larger specific resistance than the soft magnetic layers 2a.

The total film thickness of each period of the laminated soft magnetic layers 2a and nonmagnetic layers 2b is set into the range of 10 nm to 25 nm (inclusive), and FeCoSiC, FeSiC or FeC is used as the material of the soft magnetic layers 2a.

In particular, as FeCoSiC, $(FeCO)_{75}Si_{12}C_{13}$ is preferably used, and $Fe_{65}Co_{10}Si_{12}C_{13}$ is more preferably used. As FeSiC, $Fe_{75}Si_{12}C_{13}$ is used. As FeC, $Fe_{80}C_{20}$ is used. The following describes the characteristics of the magnetic backlayer having such a structure, and others while being compared with those of cases wherein other materials are used.

<Structure of the Medium>

Figure 1:
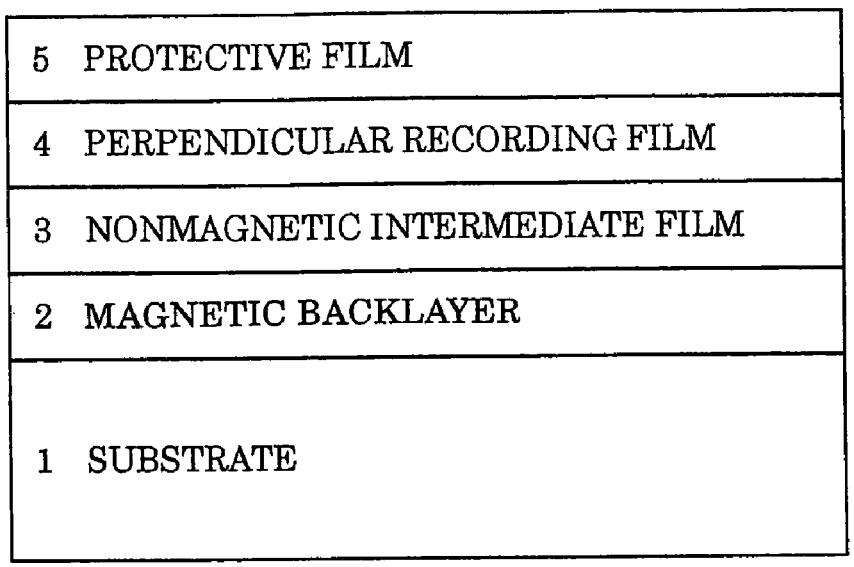
FIG. 1 is a structural view of an example of the information recording medium of this invention.

FIG. 1 illustrates a sectional structural view of one example of the information recording medium of this invention having a magnetic backlayer.

Similarly to ordinary media, the information recording medium of this invention is formed by forming, on a substrate 1 (such as a glass substrate or a silicon substrate), a magnetic backlayer 2, a nonmagnetic intermediate film 3 (such as NiP), a perpendicular recording film 4 (a TbFeCo film), and a protective film 5 (such as SiN) in this order by such a method as sputtering.

In general, the soft magnetic layers 2a which constitute the magnetic backlayer 2 of this invention are each formed as a mixed film of a magnetic element and a nonmagnetic element. In this example, the layers are each made of a material comprising iron (Fe) and carbon (C) as main components.

A metalloid element (such as Si, B or P), a typical example of which is carbon (C), is used as the nonmagnetic element.

The nonmagnetic layers 2b may be layers comprising a dielectric material, such as carbon, as a main component and one or more different elements. For example, the following can be used: a semiconductor (SiC), a nitride (SiN), an oxide (SiO or TiO) besides an insulator (C). As will be described later in Example 2, it is preferable that the specific resistance (μΩ·cm) of the material of the nonmagnetic layers 2b is larger than that of the soft magnetic layers 2a.

As will be described later in Example 1, it is preferable that the total film thickness of each period of the soft magnetic layers 2a and the nonmagnetic layers 2b of the magnetic backlayer 2 is set into the range of 10 to 25 nm (inclusive). When the thickness of the nonmagnetic layer 2b is set to 5 nm, that of the soft magnetic layer 2a is preferably from about 5 to 20 nm. This is for the following: the whole of the magnetic backlayer 2 has sufficient soft magnetic property and the amplitude of spike noises spk is sufficiently suppressed. Herein, the sufficient soft magnetic property means that the coercive force Hc is about 2 oersteds (Oe) or less. As a good value of the spike noises spk, at most 200 μV is a yardstick.

When the surface of a magnetic film is observed with a polarization microscope, the so-called cross-tie (wall) structure can be generally watched and the following can be observed: as the film thickness of the magnetic film is smaller, Neel magnetic walls are mainly formed; and as the film thickness of the magnetic film is larger, Bloch magnetic walls are mainly formed.

In the state that the Bloch magnetic walls are mainly formed, the magnetization of the magnetic wall areas is directed perpendicularly to the in-plane direction of the magnetic film. Therefore, spike noises spk are generated by magnetic fluxes based on this perpendicular magnetization.

On the other hand, in the state that the Neel magnetic walls are mainly formed, the magnetization of the magnetic wall areas is wholly directed to the in-plane direction and is rotated in the plane. Accordingly, no magnetic fluxes leak into the perpendicular direction. In other words, no spike noises are generated in the state that only Neel magnetic walls are mainly formed.

Therefore, in order to decrease spike noises spk, the film thickness of the soft magnetic layers 2a is preferably made smaller so that Neel magnetic walls will mainly be formed.

EXAMPLE 1

In order to compare characteristics of magnetic backlayers 2 wherein various materials were separately used in their soft magnetic layers 2a, media wherein each of the magnetic backlayers 2 and the protective film 5 were formed, in this order, on the substrate 1 were formed.

Substrate 1: 2.5-in., disc-form glass substrate

Soft magnetic layers 2a: magnetic films of 5 nm, 10 nm, or 20 nm thickness

Nonmagnetic films 2b: carbon (C) films of 5 nm thickness

Protective layer 5: amorphous C of 10 nm thickness

Each of the magnetic backlayers 2 is a product formed by stacking laminates each of which is made of one of the soft magnetic layers 2a and one of the nonmagnetic layers 2b (each of the laminates is referred to as a unit). The total film thickness of the soft magnetic layers 2a was set to 100 nm.

For example, in the case that each of the magnetic backlayers 2 is made of 5 unites, the film thickness of the soft magnetic layer 2a in each of the units is set to 20 nm. In the case that the soft magnetic layer 2a of 5 nm thickness is used in each unit, each of the backing magnetic layers 2 is made of 20 units.

The soft magnetic layers 2a, the nonmagnetic layers 2b, and the protective film 5 are each formed by sputtering. The formation of each of the films is formed by use of, for example, an ordinary DC magnetron sputtering machine in a film-forming gas of Ar at a gas pressure of 0.5 Pa, room temperature and a sputtering rate of 30 nm/min.

Figure 3:
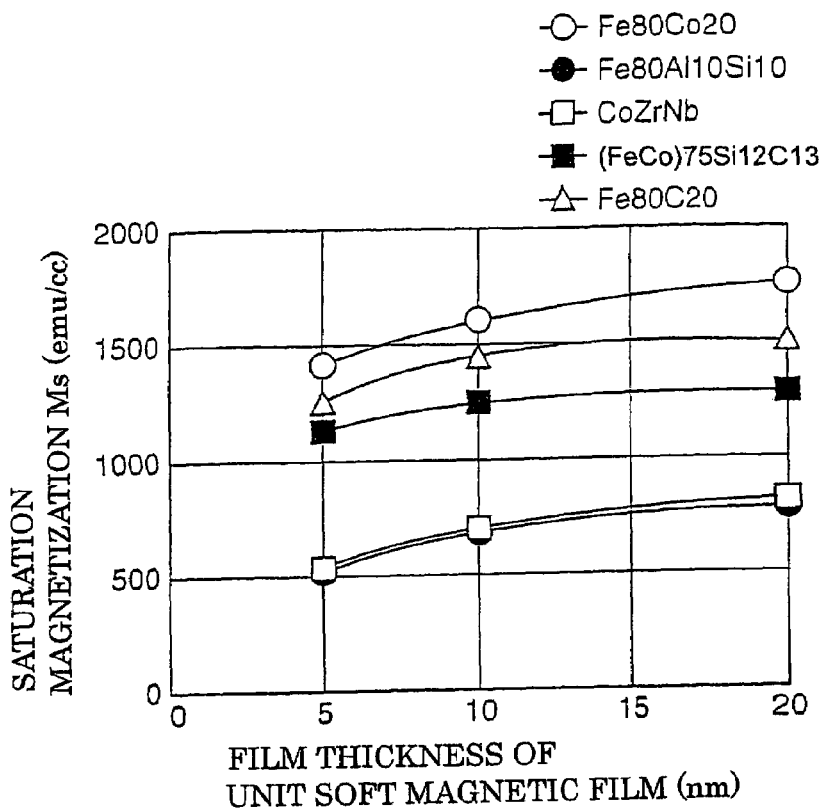
FIG. 3 is a graph of saturation magnetization Ms versus the film thickness of each soft magnetic layer in Example 1 of this invention.
Figure 4:
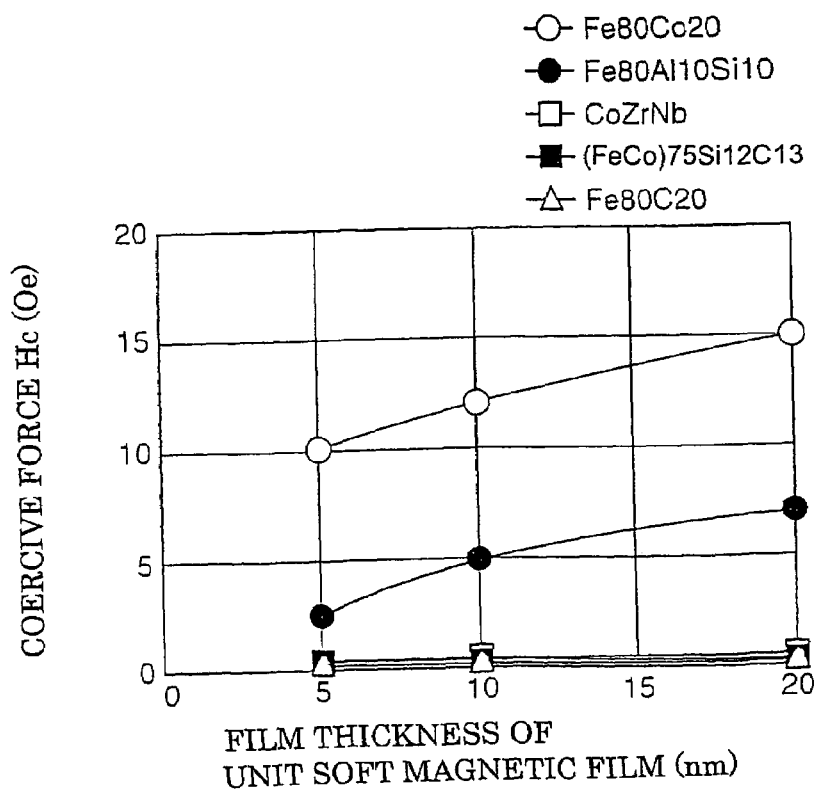
FIG. 4 is a graph of coercive force Hc versus the film thickness of the soft magnetic layer in Example 1 of this invention.
Figure 5:
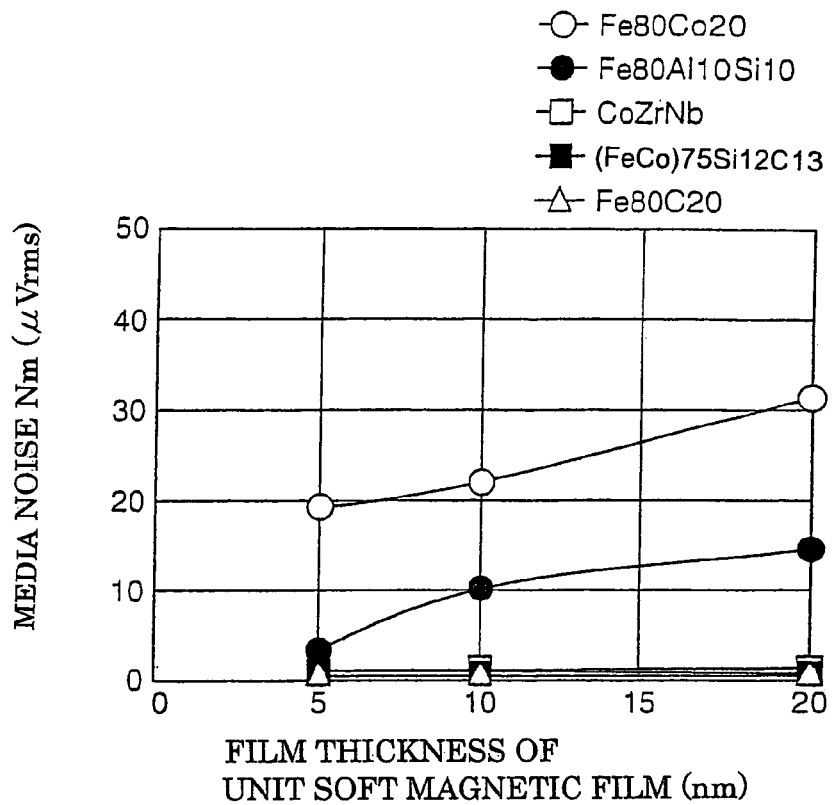
FIG. 5 is a graph of media noise Nm versus the film thickness of the soft magnetic layer in Example 1 of this invention.

In Example 1, as materials of the soft magnetic layers 2a, the following five materials were used:

(a) $Fe_{80}Co_{20}$: bcc structure of Fe (b) $Fe_{80}Al_{10}Si_{10}$: bcc structure of Fe (c) CoZrNb: amorphous structure (d) $(FeCo)_{75}Si_{12}C_{13}$: structure intermediate from microcrystalline structure to amorphous structure (e) $Fe_{80}C_{20}$: structure intermediate from microcrystalline structure to amorphous structure About these media, physical properties as illustrated in FIGS. 3 to 6 were measured. FIG. 3 shows saturation magnetization Ms (emu/cc); FIG. 4, coercive force (Oe); FIG. 5, medium noise Nm (μVrms); and FIG. 6, spike noise amplitude spk (μV). The transverse axis of each of the graphs is the film thickness (nm) of the soft magnetic layer 2a per unit.

Magnetic properties (Ms, Hc) thereof were obtained by cutting each of the media into a 5 mm×5 mm square and then measuring it with a vibration sample magnetometer (VSM). Noise properties (Nm, spk) were measured by use of a GMR head having a read core width of 0.7 μm and a read gap length of 0.15 μm. The medium noise Nm was obtained by integrating noises of 1 MHz to 100 MHz. About the spike noise amplitude spk, the largest amplitude in one circumference of each of the discs was measured with an oscilloscope.

FIG. 3 shows the saturation magnetization Ms of each of the magnetic backlayers 2 versus the film thickness of the soft magnetic layer 2a per unit. FIG. 3 demonstrates that as the film thickness of each of the media is made smaller, the saturation magnetization Ms tends to be smaller. In (a) FeCo, (d) FeCoSiC, and (e) FeC, the saturation magnetization Ms is 1000 emu/cc or more, which is a relatively large value, at any one of the thicknesses. Thus, they are preferred.

FIG. 4 shows the coercive force Hc of each of the magnetic backlayers 2 versus the film thickness of the soft magnetic layer 2a per unit. According to FIG. 4, in (c) CoZrNb, (d) FeCoSiC and (e) FeC, the coercive force Hc is smaller than 0.5 oersteds even if the film thickness of the soft magnetic layer 2a per unit is made as thick as about 20 nm. It can be therefore understood that they have a good soft magnetic property.

FIG. 5 shows the media noise Nm of each of the magnetic backlayers 2 versus the film thickness of the soft magnetic layer 2a per unit. According to FIG. 5, in (c) CoZrNb, (d) FeCoSiC, and (e) FeC, the media noise Nm is considerably low regardless of the film thickness of the soft magnetic layer 2a.

On the other hand, in (a) FeCo, a larger media noise Nm is generated than in the others. In (b) FeAlSi, the media noise becomes considerably small if the film thickness of the soft magnetic layer 2a is made as small as about 5 nm. However, in the case that the film thickness is 5 nm, the saturation magnetization Ms becomes small.

Figure 6:
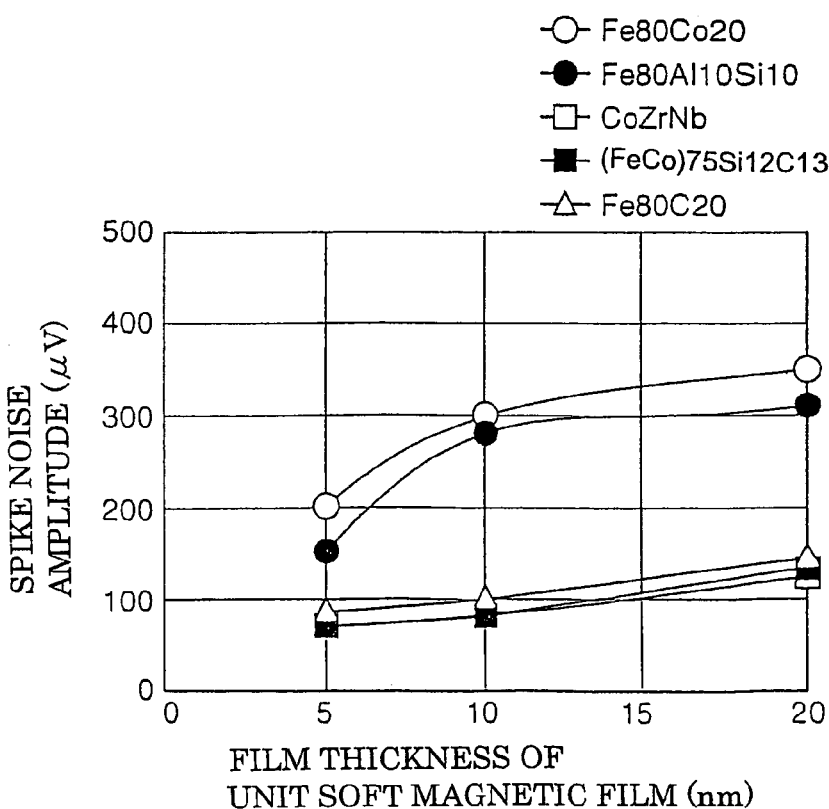
FIG. 6 is a graph of spike noise amplitude spk versus the film thickness of the soft magnetic layer in Example 1 of this invention.

FIG. 6 shows the spike noise amplitude spk of each of the magnetic backlayers 2 versus the film thickness of the soft magnetic layer 2a per unit. According to FIG. 6, in (c) CoZrNb, (d) FeCoSiC and (e) FeC, the coercive force Hc of which is small, the amplitude is about 150 µV or less. Thus, good property is exhibited.

Furthermore, the magnetic properties were minutely examined with the VSM. As a result, in (c) CoZrNb, (d) FeCoSiC, and (e) FeC, easy axes of magnetization of the magnetic backlayers were formed in the radius direction of the media. On the other hand, in (a) FeCo and (b) FeAlSi, isotropic magnetic properties were exhibited in the in-plane direction.

The formation of the easy axes of magnetization in the radius direction in the above three materials (c), (d) and (e) may be based on the expression of magnetic anisotropy as a reverse effect of magnetic strain since the formed media are in a disc-form. It may also be considered that: a situation that magnetic clusters were easily formed was generated in the radius direction since the incidence direction of sputtering particles was somewhat directed to an oblique direction; thus, magnetic anisotropy based on a sort of configuration magnetic anisotropy was expressed.

It can be said from the graphs of the characteristics of FIGS. 3 to 6 that: in order to satisfy the above-mentioned characteristics of the magnetic backlayer, it is preferable to use, for the soft magnetic layers 2a, (d) FeCoSiC or (e) FeC, and set the film thickness of the soft magnetic layer 2a per unit into the range of 5 to 20 nm, that is, set the film thickness of each unit (the total film thickness of one of the soft magnetic layers 2a and one of the nonmagnetic layers 2b) in the magnetic backlayer 2 into the range of about 10 to 25 nm.

Figure 7:
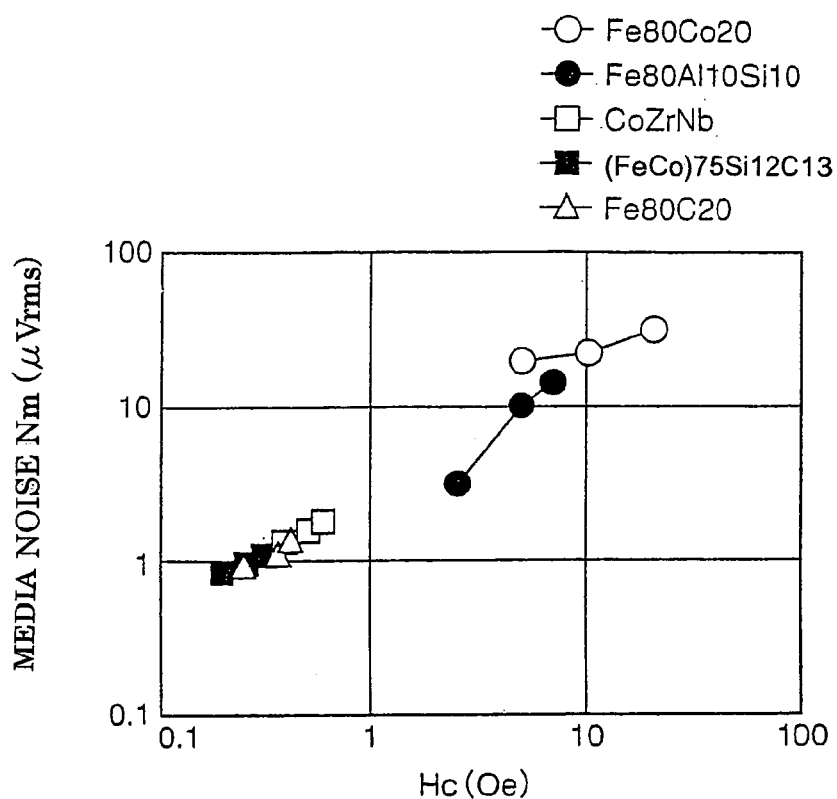
FIG. 7 is a graph of a relationship between the coercive force Hc and the media noise Nm in Example 1 of this invention.

FIG. 7 is a relationship graph about the coercive force Hc and the media noise Nm, which were obtained from FIGS. 4 and 5. This demonstrates that: as the coercive force Hc is smaller, the media noise Nm is smaller; and the coercive force Hc should be made smaller than 0.5 oersted in order to set the media noise Nm to about zero. The coercive force Hc herein means the coercive force $H_{c0}$ along the easy axes of magnetization.

EXAMPLE 2

Properties in the case of changing the material of the nonmagnetic layers 2b are described herein. Media having the same structure as used in Example 1 and shown in FIG. 2 wherein the materials of their nonmagnetic layers 2b were changed to C, SiC, Cr and Ti, respectively, were formed. As the material of the soft magnetic layers 2a, $(FeCO)_{75}Si_{12}C_{13}$ was used. The film thickness of the soft magnetic layer 2a per unit and that of the nonmagnetic layer 2b per unit were set to 20 nm and 5 nm, respectively, and the total film thickness of the soft magnetic layers 2a was set to 100 nm.

Figure 8:
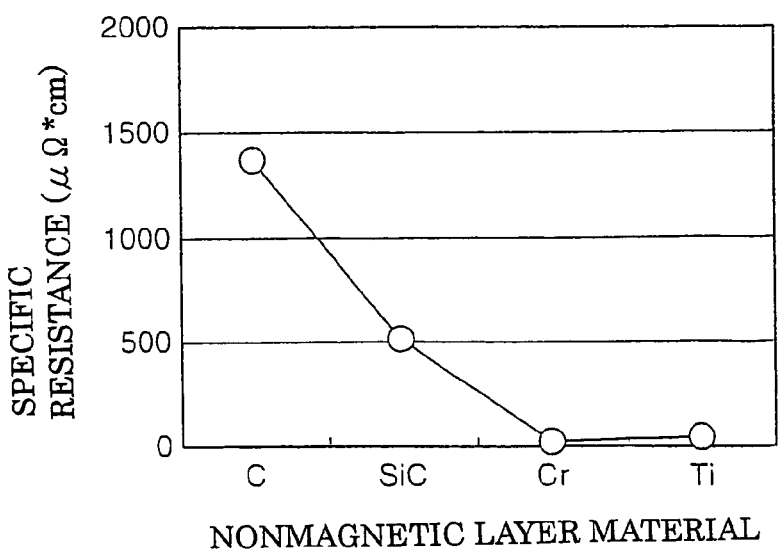
FIG. 8 is a graph of the specific resistances of nonmagnetic materials in Example 2 of this invention.

FIG. 8 shows the specific resistance of each of the materials of nonmagnetic layers 2b. According to this, the specific resistances of the insulator C and the semiconductor SiC are 1375 and 520, respectively, and are large. However, the specific resistances of the metals Cr and Ti are 13 and 42, respectively, and are small. On the other hand, the specific resistance of $(FeCO)_{75}Si_{12}C_{13}$, which constitutes the soft magnetic layers 2a, is 150 (µΩ·cm), and is considerably smaller than those of C and SiC.

Figure 9:
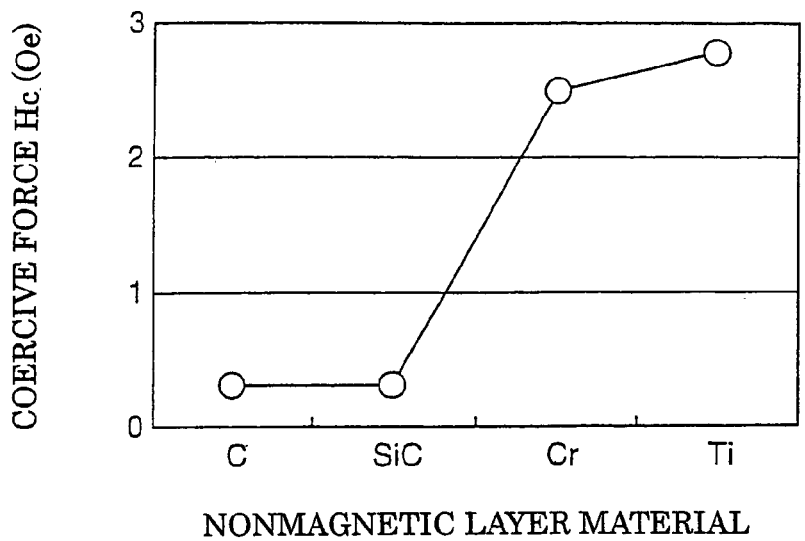
FIG. 9 is a graph of coercive force Hc versus the nonmagnetic layer materials in Example 2 of this invention.

FIG. 9 shows the coercive force Hc of the magnetic backlayer 2 wherein each of the materials of the nonmagnetic layers 2b was used. This demonstrates that: in the case of using the insulator C and the semiconductor SiC separately, the coercive forces Hc are 0.3 oersted and are considerably small; however, in the case of using the metals Cr and Ti, the coercive forces Hc are 2.5 and 2.8 oersteds, respectively, and are considerably large values. That is, it is preferable from the viewpoint of soft magnetic property to use C or SiC, which makes the coercive force Hc small.

Figure 10:
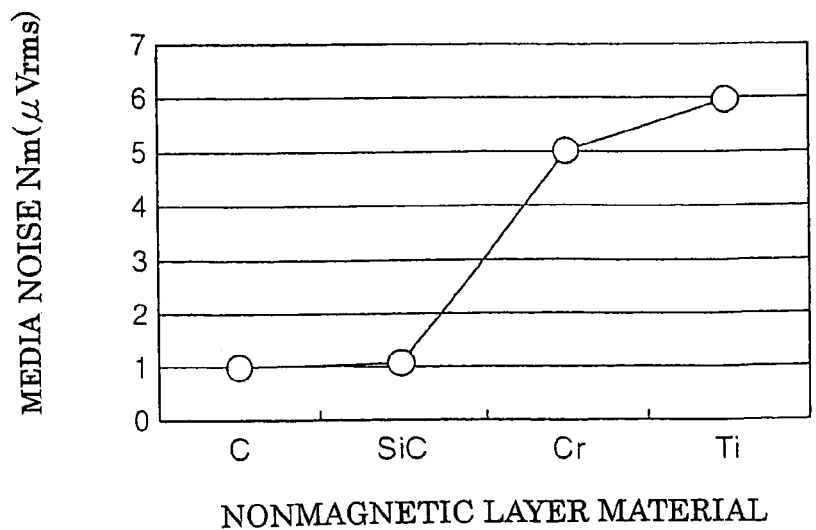
FIG. 10 is a graph of media noise Nm versus the nonmagnetic layer materials in Example 2 of this invention.

FIG. 10 shows the media noise Nm of the magnetic backlayer 2 wherein each of the materials of the nonmagnetic layers 2b was used. This demonstrates that: in the case of using the insulator C and the semiconductor SiC, the media noises Nm are 1 and 1.1 (µVrms), respectively, and are considerably small; however, in the case of using the metals Cr and Ti, the medium noises Nm are 5 and 6 (µVrms), respectively, and are considerably large. That is, it is preferable from a decrease in media noise Nm to use C or SiC.

Figure 11:
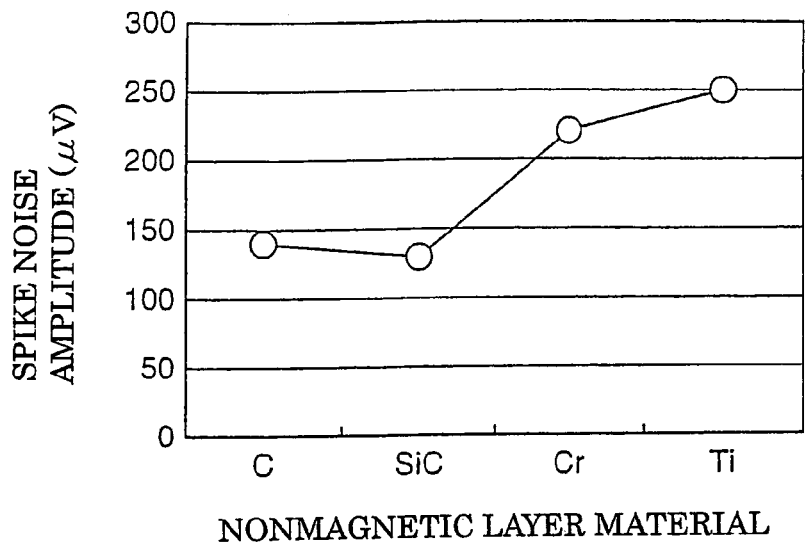
FIG. 11 is a graph of spike noise spk versus the nonmagnetic layer materials in Example 2 of this invention.

FIG. 11 shows the spike noise amplitude spk of the magnetic backlayer 2 wherein each of the materials of the nonmagnetic layers 2b was used. This demonstrates that the spike noises spk about the materials C, SiC, Cr and Ti of the nonmagnetic layers 2b are 140, 130, 220 and 250 (µV), respectively. It is preferable from the viewpoint of a decrease in spike noise spk to use C or SiC.

Therefore, it can be understood from the results of FIGS. 9 to 11 that it is advisable to use, as the material of the nonmagnetic layers 2b, an insulator, a typical example of which is carbon (C), or a semiconductor SiC.

Besides these, the following may be used: a nitride (SiN), an oxide (SiO or TiO) or the like, which exhibits a coercive force Hc, a media noise Nm and a spike noise spk similar to those of C and SiC. In other words, it appears that the material of the nonmagnetic layers 2b is preferably a dielectric material.

It can be said from the results of FIG. 8 that it is preferable that the specific resistance of the material used in the nonmagnetic layers 2b is larger than that of the soft magnetic layers 2a.

EXAMPLE 3

The relationship between the surface roughness Ra of the magnetic backlayer 2 and noises (Nm and spk) is described herein. Moreover, it is demonstrated that: as the surface roughness Ra is smaller, the noises are smaller; and in order to make the surface roughness Ra of the magnetic backlayer 2 small, it is necessary to lower the sputtering gas pressure at the time of forming the nonmagnetic layers 2b.

In Example 2, it has been understood that the noises (Nm and spk) are considerably different in accordance with the material of the nonmagnetic layers 2b. However, the medium noise Nm and the spike noise spk are different as well dependently on the surface roughness of the magnetic backlayer 2. It appears that the surface roughness is related to the thin film growing mode of the soft magnetic layers 2a and the nonmagnetic layers 2b.

The surface roughness of a film can be varied with the sputtering gas pressure at the time of forming the film. Thus, in the case that carbon C was used for the nonmagnetic layers 2b, the sputtering gas pressure (Pa) at the time of forming the nonmagnetic layers 2b was changed to measure various physical property values. In this way, the relationship between the surface roughness Ra of the magnetic backlayer 2 and the media noise Nm was examined.

In Example 3, media having the same structure as in Example 2 were formed. $(FeCO)_{75}Si_{12}C_{13}$ (20 nm per unit) was used for the soft magnetic layers 2a, and carbon (C) (5 nm per unit) was used for the nonmagnetic layers 2b.

FIGS. 12 to 15 show graphs a change in each physical property versus the sputtering gas pressure (Pa) for the nonmagnetic layer 2b.

Figure 12:
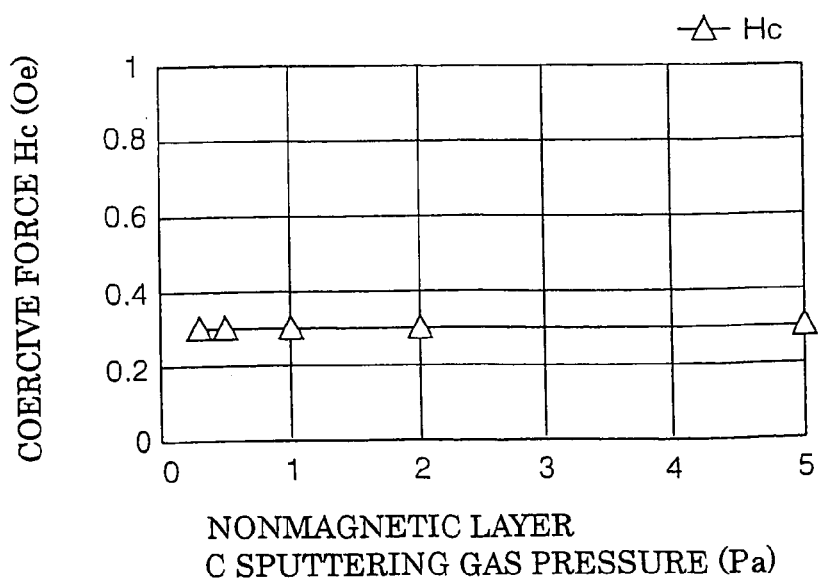
FIG. 12 is a graph of coercive force Hc versus the sputtering gas pressure for nonmagnetic layers in Example 3 of this invention.
Figure 13:
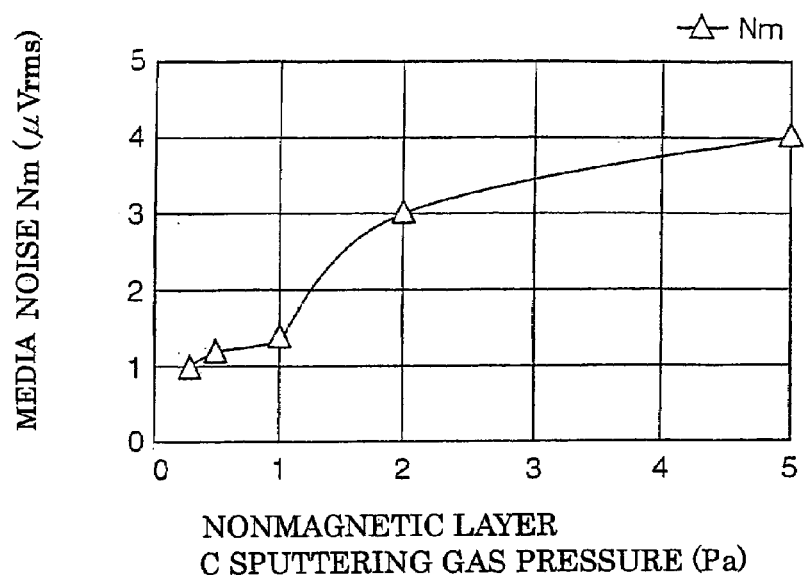
FIG. 13 is a graph of medium noise Nm versus the sputtering gas pressure for the nonmagnetic layers in Example 3 of this invention.
Figure 14:
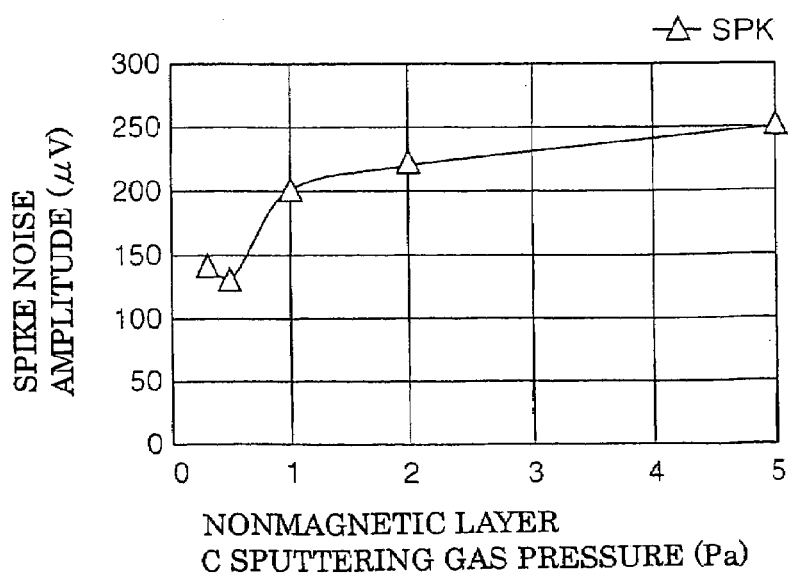
FIG. 14 is a graph of spike noise amplitude spk versus the sputtering gas pressure for the nonmagnetic layers in Example 3 of this invention.
Figure 15:
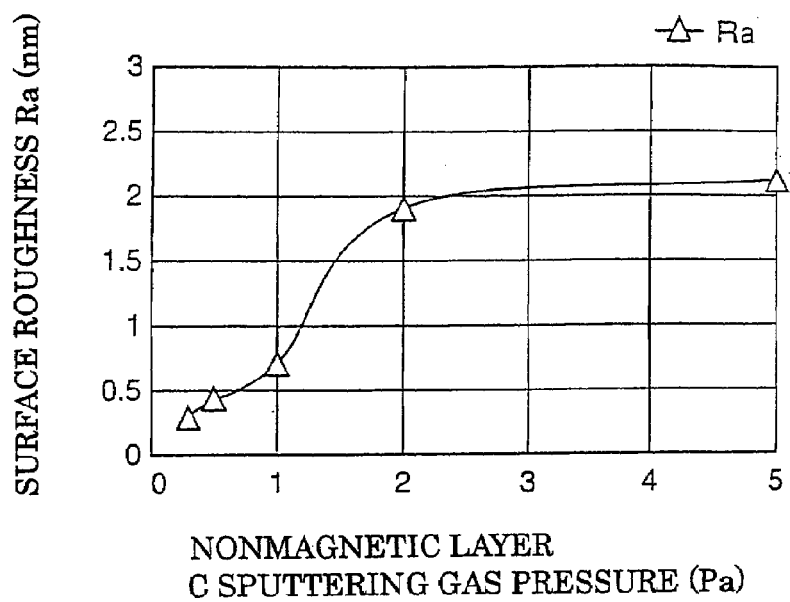
FIG. 15 is a graph of surface roughness Ra versus the sputtering gas pressure for the nonmagnetic layers in Example 3 of this invention.
Figure 16:
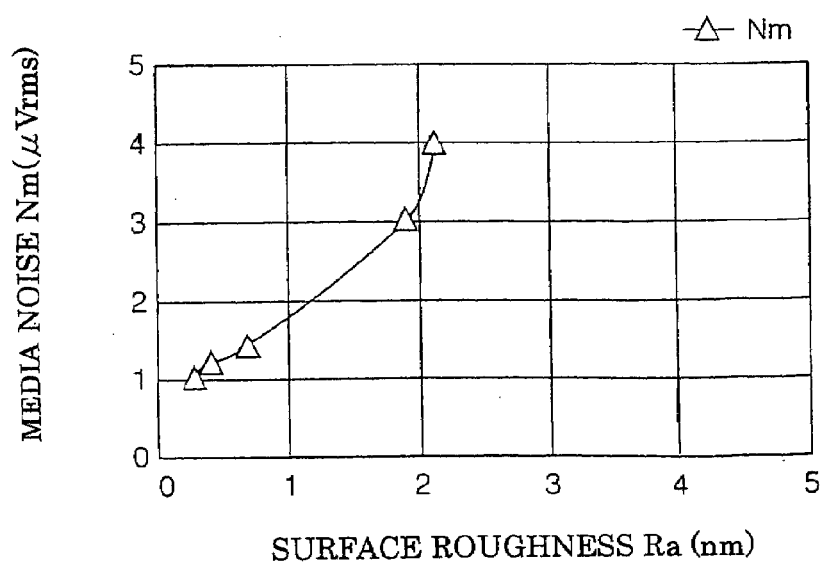
FIG. 16 is a graph of a relationship between the surface roughness Ra and the media noise Nm in Example 3 of this invention.

According to FIG. 12, it can be understood that even if the sputtering gas pressure is changed, the coercive force Hc of the magnetic backlayer 2 hardly changes. According to FIG. 13, it can be understood that as the sputtering gas pressure is made lower, the media noise Nm becomes smaller. According to FIG. 14, it can be understood that as the sputtering gas pressure is made lower, the spike noise amplitude spk also becomes smaller. According to FIG. 15, it can be understood that as the sputtering gas pressure is made lower, the surface roughness Ra also becomes smaller. FIG. 16 is a relationship graph about the surface roughness Ra and the media noise Nm obtained from FIGS. 13 and 15.

It has been understood from the total of the results of FIGS. 12 to 15 that as the surface roughness Ra is smaller, the media noise Nm and the spike noise spk become smaller.

In particular, in the case that the surface roughness Ra of the magnetic backlayer 2 is made smaller than 1 nm, the media noise Nm can be decreased into 2 (μVrms) or less and the spike noise spk can be decreased into 200 μV or less.

According to the above, in order to decrease the media noise Nm and the spike noise spk, it is preferable to make the surface roughness Ra of the magnetic backlayer 2 smaller than 1 nm and further make the sputtering gas pressure at the time of forming the nonmagnetic layers 2b lower than about 1 (Pa).

EXAMPLE 4

Herein, the following is described: the above-mentioned (d) FeCoSiC and (e) FeC has a sufficient soft magnetic property even if it is made into a mono-layered soft magnetic layer 2a. Media wherein the soft magnetic layer 2a (of five kinds) and a protective layer 5 (amorphous C, 10 nm) were laminated, in this order, on a 2.5 in. disc substrate 1 were produced.

For the soft magnetic layer 2a, the materials (a) to (e) of the five kinds described in Example 1 were used. About each of the kinds, media having film thicknesses of 5 nm, 10 nm, 20 nm, 40 nm, 60 nm, 80 nm, and 100 nm were produced. No nonmagnetic layer 2b was laminated therein.

FIGS. 17 to 20 show graphs of various property values versus the film thickness of each of the soft magnetic layers 2a. FIG. 21 is a relationship graph about the coercive force Hc and the media noise Nm obtained from FIGS. 18 and 19.

Figure 17:
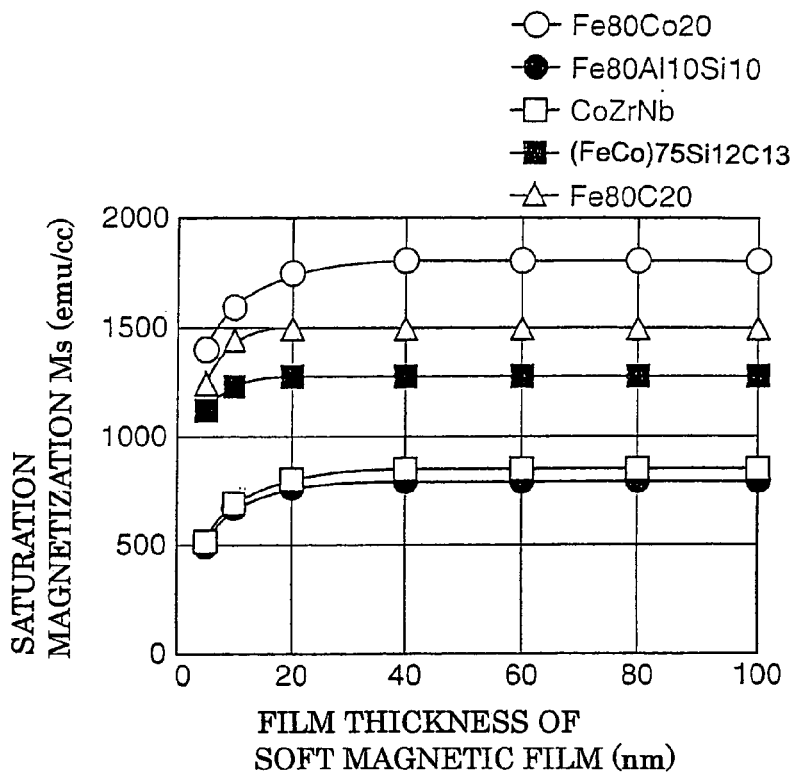
FIG. 17 is a graph of saturation magnetization Ms versus the film thickness of each mono-layered soft magnetic film in Example 4 of this invention.

FIG. 17 shows the saturation magnetization Ms versus the film thickness. In (a) FeCo, (d) FeCoSiC, and (e) FeC, the shown saturation magnetization Ms is a relatively high value of 1000 emu/cc at any film thickness. However, in (b) FeAlSi and (c) CoZrNb, the saturation magnetization Ms is smaller than 1000 emu/cc.

In short, in order to require a large saturation magnetization Ms, (a) FeCo, (d) FeCoSiC, and (e) FeC are preferable among the five soft magnetic layers 2a.

Figure 18:
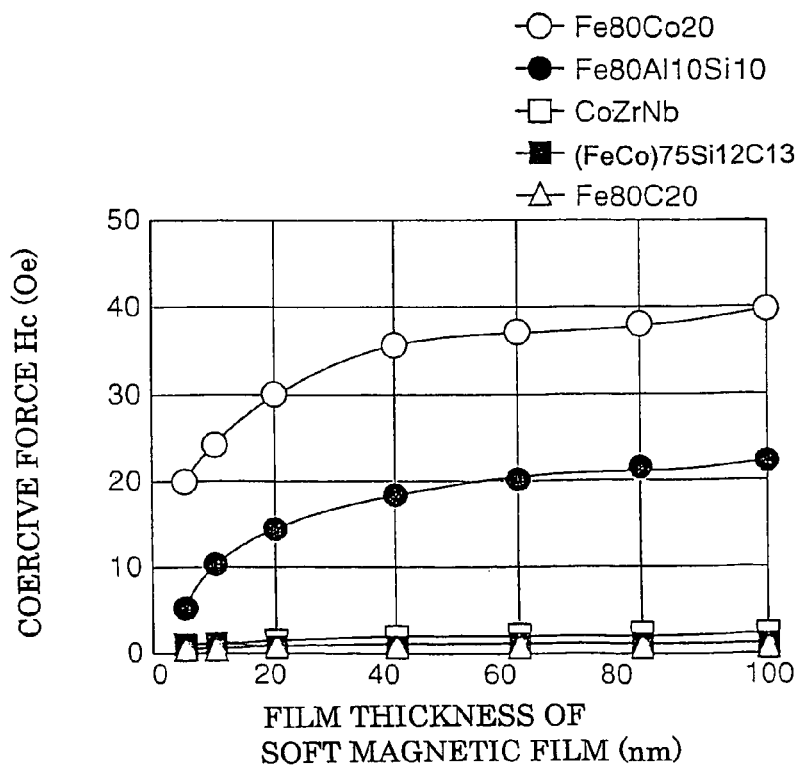
FIG. 18 is a graph of coercive force Hc versus the film thickness of the mono-layered soft magnetic film in Example 4 of this invention.

FIG. 18 is the coercive force Hc versus the film thickness. In (c) CoZrNb, (d) FeCoSiC, and (e) FeC, the coercive force Hc is 2 oersteds or less at any thickness, and they have a sufficient soft magnetic property.

In (a) FeCo and (b) FeAlSi, the coercive force Hc is small but is a relatively large value when the film thickness is as thin as 20 nm or less. Thus, it can not be said that a sufficient soft magnetic property is exhibited. Therefore, in order to require a small coercive force Hc, (c) CoZrNb, (d) FeCoSiC, and (e) FeC are preferable.

Figure 19:
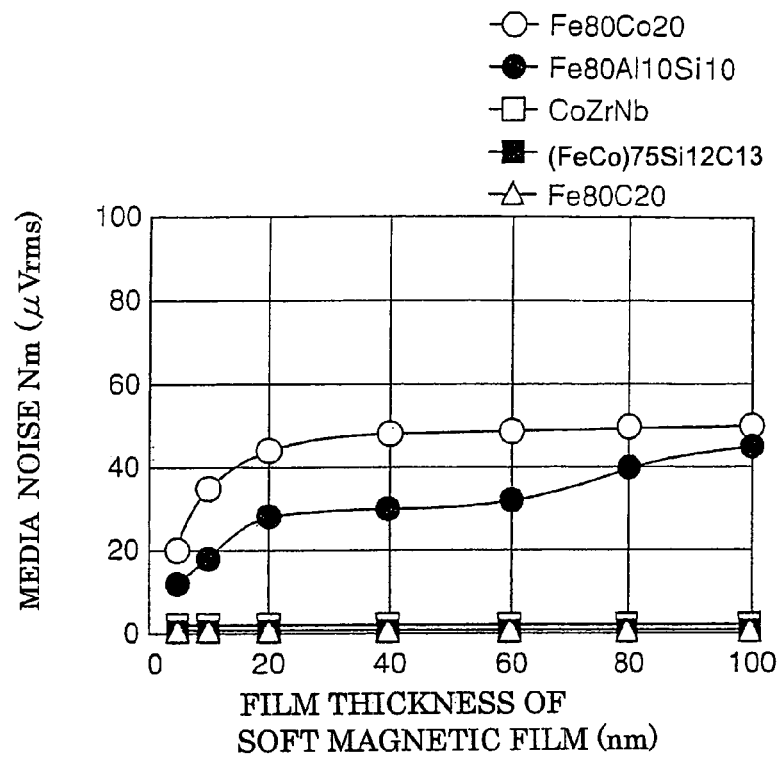
FIG. 19 is a graph of medium noise Nm versus the film thickness of the mono-layered soft magnetic film in Example 4 of this invention.

FIG. 19 shows the media noise Nm versus the film thickness. In (c) CoZrNb, (d) FeCoSiC, and (e) FeC, the noise is a considerably low value of 3 μVrms or less at any film thickness.

On the other hand, in (a) FeCo and (b) FeAlSi, the media noise Nm is small but is a larger value than 10 μVrms when the film thickness is 10 nm or less. Therefore, in order to decrease the media noise Nm, (c) CoZrNb, (d) FeCoSiC, and (e) FeC are preferable likewise about the coercive force Hc.

Figure 20:
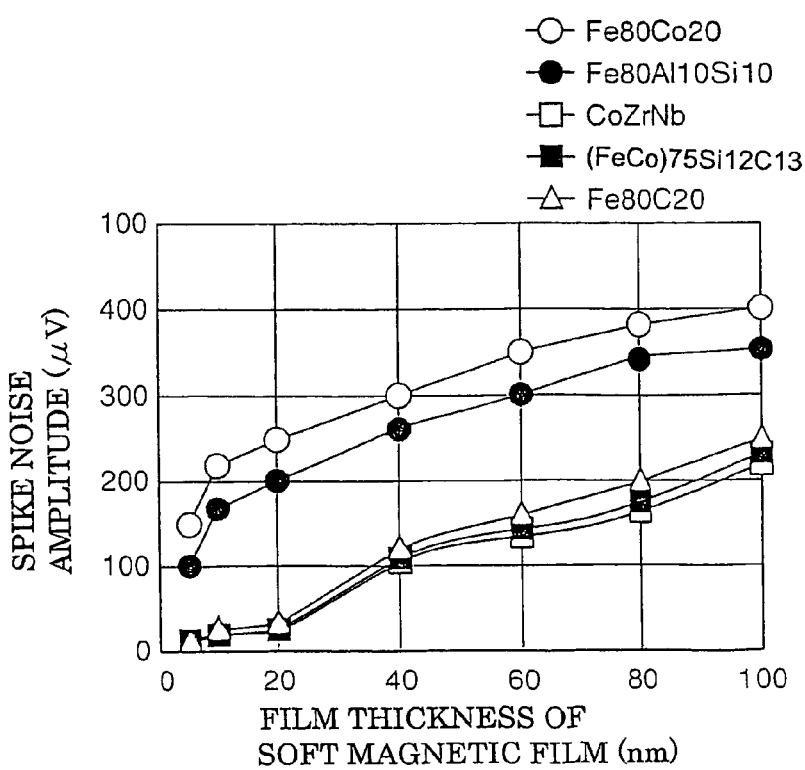
FIG. 20 is a graph of spike noise amplitude spk versus the film thickness of the mono-layered soft magnetic film in Example 4 of this invention.
Figure 21:
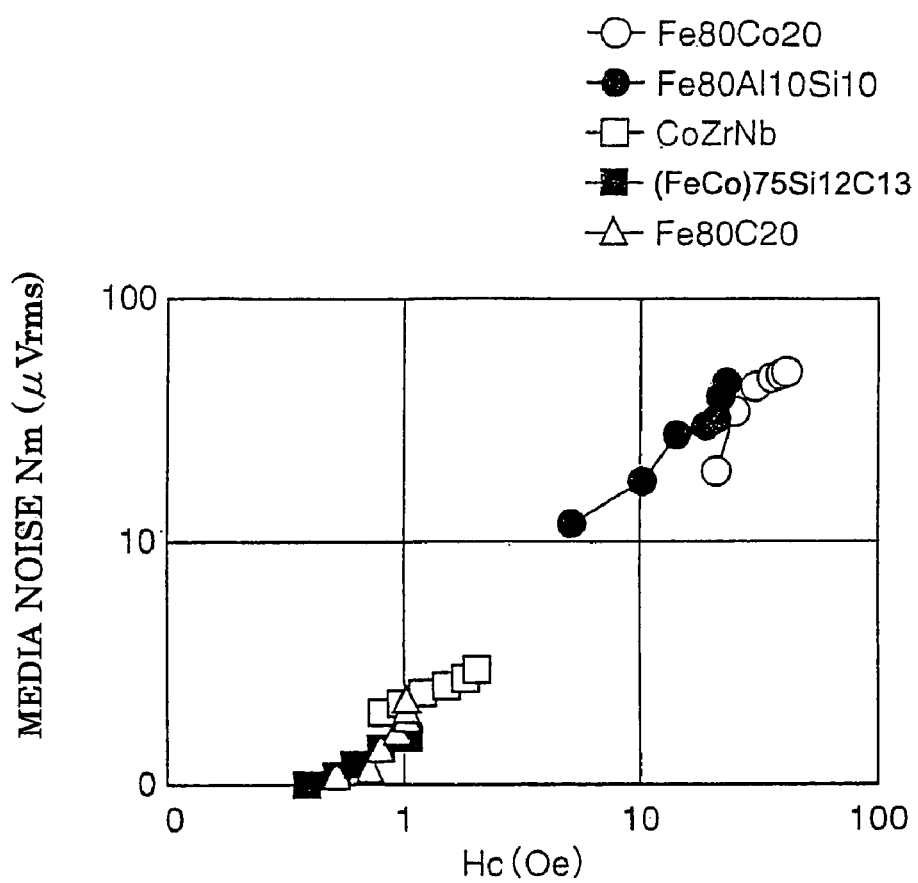
FIG. 21 is a relationship between the coercive force Hc and the media noise Nm in Example 4 of this invention.

FIG. 20 shows the spike noise spk versus the film thickness. About any one of the soft magnetic layers 2a, the spike noise spk tends to be larger as the film thickness is larger. In (c) CoZrNb, (d) FeCoSiC, and (e) FeC, the spike noise spk is smaller than 50 μV when the film thickness is as small as 20 nm or less. Therefore, in order to decrease the spike noise, (c) CoZrNb, (d) FeCoSiC, and (e) FeC are preferable as well.

According to FIG. 21, it can be understood that about the media using the soft magnetic layer 2a the coercive force Hc of which is small, the media noise Nm thereof is small. Likewise, about the media using the soft magnetic layer 2a the coercive force Hc of which is small, the spike noise spk is small.

The above demonstrates that in the case of selecting, when using the mono-layered soft magnetic layer 2a, materials required for the soft magnetic layer, about which all of the coercive force Hc, the media noise Nm and the spike noise spk are small and the saturation magnetization Ms is as large as possible, (d) FeCoSiC and (e) FeC correspond to the materials.

When the film thickness is in the range of 5 to 20 nm (inclusive), the spike noise spk is also smaller than 30 μV;

therefore, the spike noise is suppressed from increasing even if a large number of the laminated soft magnetic layers 2a are used as in Example 1.

In this example, $Fe_{65}Co_{10}Si_{12}C_{13}$ is used as FeCoSiC, and $Fe_{80}C_{20}$ is used as FeC. However, it can be considered from the above-mentioned results that when the material of the soft magnetic layer 2a is a material wherein Fe, which is a magnetic element, is used as a main component and a metalloid element (nonmagnetic element) such as C, Si, B or P is added thereto besides the above-mentioned two materials, similar superior soft magnetic property and noise properties are exhibited.

According to this invention, a magnetic backlayer is made to have a laminated structure of soft magnetic layers and nonmagnetic layers, set the total film thickness of each period of the soft magnetic layers and the nonmagnetic layers into the range of 10 to 25 nm (inclusive), and make the easy axes of magnetization of the soft magnetic layers into the in-plane direction and the radius direction of a substrate. It is therefore possible to provide a magnetic backlayer wherein the following are realized: a low coercive force, a high saturation magnetization, a low spike noise, and a Neel magnetic wall structure of magnetization of its soft magnetic layers.

The invention claimed is:

1. A magnetic backlayer of an information recording medium which has a structure in that soft magnetic layers comprising iron and carbon as main components and nonmagnetic layers are alternately laminated forming a film, is formed on or over a disc-shaped substrate, and has easy axes of magnetization in the in-plane direction of the film and the radial direction of the substrate, wherein;

the saturation magnetization Ms satisfies the following: Ms>1000 emu/cc;

the magnetization of the soft magnetic layers has a Neel magnetic wall structure; and the coercive force $H_{c0}$ along the easy axes of magnetization satisfies the following: $H_{c0}$<0.5 oersted, and the coercive force $H_{c1}$ of the soft magnetic layers themselves satisfies the following: $H_{c1}$<2 oersteds.

2. The magnetic backlayer according to claim 1, wherein the total film thickness of each period of the soft magnetic layers and the nonmagnetic layers is in the range of 10 to 25 nm (inclusive).

3. The magnetic backlayer according to claim 1, wherein the soft magnetic layers comprise a magnetic material made mainly of Fe and a nonmagnetic material comprising a metalloid element.

4. The magnetic backlayer according to claim 1, wherein the nonmagnetic layers are made mainly of a dielectric material and the specific resistance of the nonmagnetic layers is larger than that of the soft magnetic layers.

5. The magnetic backlayer according to claim 1, which has a surface roughness Ra adjusted as follows: Ra<1 nm.

6. A magnetic recording medium which comprises:

a perpendicular recording film wherein easy axes of magnetization are in the direction perpendicular thereto, and a magnetic film which has a structure in that soft magnetic layers comprising iron and carbon as main components and nonmagnetic layers are alternately laminated, is formed on or over a disc shaped substrate, has easy axes of magnetization in the in-plane direction of the magnetic film and the radial direction of the substrate, and has a saturation magnetization Ms satisfying the following: Ms>1000 emu/cc.

7. The magnetic backlayer according to claim 1, wherein the magnetic backlayer is a backing film for a perpendicular recording film formed thereon.

* * * * *